US012365384B2

(12) United States Patent
Klintberg et al.

(10) Patent No.: US 12,365,384 B2
(45) Date of Patent: Jul. 22, 2025

(54) HANDLING OF BACKLASH IN A STEERING HOUSE OF A VEHICLE STEERING SYSTEM

(71) Applicant: Volvo Autonomous Solutions AB, Gothenburg (SE)

(72) Inventors: Emil Klintberg, Torslanda (SE); Robert Hult, Torslanda (SE); Dandan Ge, Torslanda (SE)

(73) Assignee: Volvo Autonomous Solutions AB, Gothenburg (SE)

( * ) Notice: Subject to any disclaimer, the term of this patent is extended or adjusted under 35 U.S.C. 154(b) by 203 days.

(21) Appl. No.: 18/261,358

(22) PCT Filed: Jan. 18, 2021

(86) PCT No.: PCT/EP2021/050934
§ 371 (c)(1),
(2) Date: Jul. 13, 2023

(87) PCT Pub. No.: WO2022/152400
PCT Pub. Date: Jul. 21, 2022

(65) Prior Publication Data
US 2024/0075980 A1 Mar. 7, 2024

(51) Int. Cl.
*B62D 5/04* (2006.01)
(52) U.S. Cl.
CPC .................................. *B62D 5/0484* (2013.01)
(58) Field of Classification Search
CPC .................................................. B62D 5/0484
See application file for complete search history.

(56) References Cited

U.S. PATENT DOCUMENTS 6,597,141 B1 * 7/2003 Wilson-Jones ............ H02P 6/16
417/42
8,296,011 B2 * 10/2012 Hales .................... B62D 5/0463
701/41
(Continued)

FOREIGN PATENT DOCUMENTS

DE 69818833 T2 7/2004

OTHER PUBLICATIONS

International Search Report and Written Opinion in corresponding International Application No. PCT/EP2021/050934 mailed Oct. 12, 2021 (12 pages).

*Primary Examiner* — George C Jin
(74) *Attorney, Agent, or Firm* — Venable LLP; Jeffri A. Kaminski

(57) ABSTRACT

There is provided mechanisms for compensating for backlash in a steering house of a steering system in a vehicle. A method is performed by a controller of the steering system. The method comprises obtaining a hysteresis model of the backlash in the steering house. The hysteresis model has an inverse. The method comprises obtaining a control signal to be input to an electric motor of the steering system. The control signal defines a desired set point for the steering system. The method comprises determining an adjusted set point for the steering system based on the inverse of the hysteresis model, the desired set point, and a current operating point in the hysteresis model. The adjusted set point defines an adjusted control signal. The method comprises compensating for the backlash in the steering house by providing the adjusted control signal, instead of the control signal, as input to the electric motor.

29 Claims, 5 Drawing Sheets

(56) References Cited

U.S. PATENT DOCUMENTS

| | | | |
|---|---|---|---|
| 8,589,031 B2 | 11/2013 | Birsching et al. | |
| 9,150,244 B2 | 10/2015 | Klein | |
| 2009/0157258 A1* | 6/2009 | Hales | B62D 5/0463 |
| | | | 180/443 |
| 2012/0090913 A1* | 4/2012 | Terada | B62D 5/046 |
| | | | 180/446 |
| 2014/0360803 A1* | 12/2014 | Hori | G01L 5/221 |
| | | | 180/446 |
| 2020/0277006 A1* | 9/2020 | Zhang | B62D 5/0487 |
| 2020/0307685 A1* | 10/2020 | Akiyama | G05D 1/0246 |
| 2021/0362777 A1* | 11/2021 | Zhao | B62D 5/049 |

* cited by examiner

HANDLING OF BACKLASH IN A STEERING HOUSE OF A VEHICLE STEERING SYSTEM

CROSS-REFERENCE TO RELATED APPLICATIONS

This application is a U.S. National Stage application of PCT/EP2021/050934, Jan. 18, 2021 and published on Jul. 21, 2022 as WO 2022/152400, all of which is hereby incorporated by reference in its entirety.

TECHNICAL FIELD

Embodiments presented herein relate to a method, a controller, a computer program, and a computer program product for compensating for backlash in a steering house of a steering system in a vehicle.

BACKGROUND

In general terms, a steering system refers to a system of components, linkages, etc. which allows any land vehicle (such as a truck, car, motorcycle, or bicycle) to follow a desired course of travel. The primary purpose of the steering system is thus to allow the driver of the vehicle to guide the vehicle along the desired course of travel.

One conventional steering system is arranged to, via a steering column, turn the road-wheels (such as the front wheels) of the vehicle upon a hand-operated steering wheel being turned. The steering wheel is typically positioned in front of the driver. The steering column extends either between the steering wheel and a steering house or between the steering wheel and an electric motor which then in turn is coupled to the steering house. The steering column might comprise universal joints to allow the steering column to deviate somewhat from a straight line between the steering wheel and the electric motor (or the steering house). The electric motor forms part of a power steering system that aids the driver to steer the vehicle by augmenting the steering effort needed to turn the steering wheel, making it easier for the vehicle to turn or maneuver. In some Automated Driving Systems (ADSs) and Advanced Driving Support Systems (ADASs), the driver might apply considerably little torque, or not apply any torque at all, at the steering wheel, and the ADS or ADAS controls the steering system of the vehicle directly via the electric motor.

The output shaft of the steering house is connected to a pitman arm, which moves the road-wheels of the vehicle via a drag link, a wheel lever and a tie rod. In the remainder of this disclosure, the components between the steering house and the road-wheel are collectively denoted steering linkage. In the steering house the input torque is amplified, typically using hydraulics. A steering house of this type often exhibits non-negligible backlash at several places in the torque transfer.

In general terms, the amount of backlash increases with wear. It is then possible to gradually tighten the gears in the steering house, although this increases the rate of the wear. Hence, there is a trade-off between having a small amount of backlash and a slow wear of the gears in the steering house. In control theory, control loops with static nonlinearities can result in oscillatory behavior (so-called limit cycles) of the controlled system. In the specific case of backlash, the amplitude of the oscillations typically increases with the amount of backlash (i.e., with the size of the play). To ensure that the ADS or ADAS behaves as expected, it is important to ensure that the backlash is not larger than what the system has been designed for.

Hence, there is a need for accurate monitoring and handling of backlash in a steering house of a steering system in a vehicle.

SUMMARY

An object of embodiments herein is to provide a method, a controller, a computer program and a computer program product addressing the above issues.

According to a first aspect there is presented a method for compensating for backlash in a steering house of a steering system in a vehicle. The method is performed by a controller of the steering system. The method comprises obtaining a hysteresis model of the backlash in the steering house. The hysteresis model has an inverse. The method comprises obtaining a control signal to be input to an electric motor of the steering system. The control signal defines a desired set point for the steering system. The method comprises determining an adjusted set point for the steering system based on the inverse of the hysteresis model, the desired set point, and a current operating point in the hysteresis model. The adjusted set point defines an adjusted control signal. The method comprises compensating for the backlash in the steering house by providing the adjusted control signal, instead of the control signal, as input to the electric motor.

According to a second aspect there is presented a controller for compensating for backlash in a steering house of a steering system in a vehicle. The controller comprises processing circuitry. The processing circuitry is configured to cause the controller to obtain a hysteresis model of the backlash in the steering house. The hysteresis model has an inverse. The processing circuitry is configured to cause the controller to obtain a control signal to be input to an electric motor of the steering system. The control signal defines a desired set point for the steering system. The processing circuitry is configured to cause the controller to determine an adjusted set point for the steering system based on the inverse of the hysteresis model, the desired set point, and a current operating point in the hysteresis model. The adjusted set point defines an adjusted control signal. The processing circuitry is configured to cause the controller to compensate for the backlash in the steering house by providing the adjusted control signal, instead of the control signal, as input to the electric motor.

According to a third aspect there is presented a vehicle. The vehicle comprises a steering system. The steering system comprises a controller according to the second aspect.

According to a fourth aspect there is presented a computer program for compensating for backlash in a steering house of a steering system in a vehicle, the computer program comprising computer program code which, when run on a controller of the steering system, causes the controller to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

Advantageously these aspects provide accurate monitoring and handling of backlash in a steering house of a steering system in a vehicle.

In some embodiments, the vehicle comprises and ADS or an ADAS, and wherein the steering system is part of the ADS or ADAS.

In some embodiments, the control signal to be input to the electric motor is provided as a command value from a steering function of the ADS or ADAS, and the command value sets a desired value for an angle of an output shaft of the steering house.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION OF EXAMPLE EMBODIMENTS OF THE INVENTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
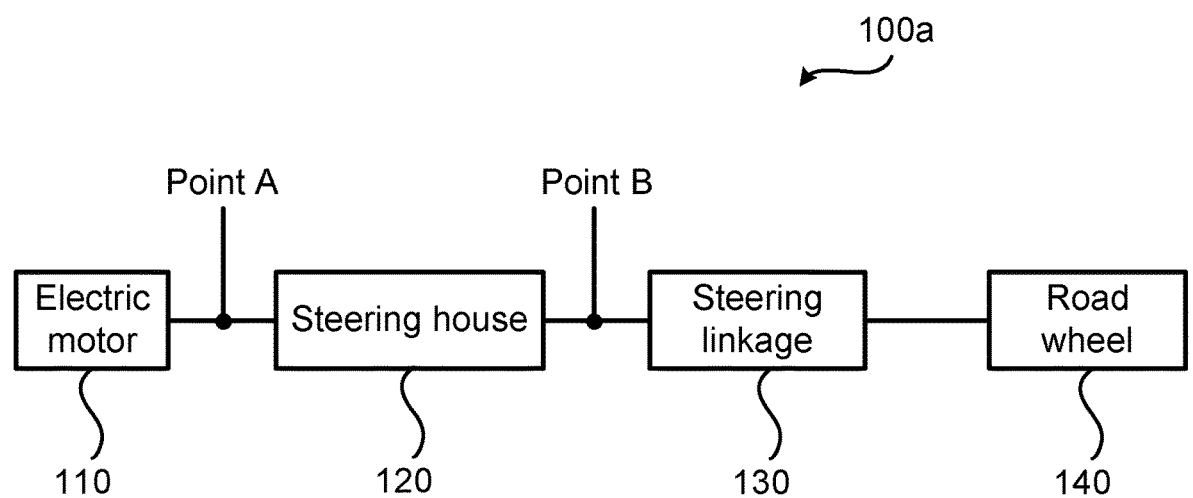
FIG. 1 is block diagram of a steering system according to an embodiment.

FIG. 1 is a block diagram of a steering system 100a according to an embodiment. The steering system 100a comprises an electric motor 110, a steering house 120, steering linkage 130, and a road-wheel (or pair, or set, of road-wheels) 140. The electric motor 110 is coupled to the input shaft of the steering house 120 and the output shaft of the steering house is connected to the road-wheel 140 via the steering linkage 130. The steering linkage 130 comprises a pitman arm, which moves the road-wheels of the vehicle via a drag link, a wheel lever and a tie rod. In the steering house, input torque is amplified, typically using hydraulics. As disclosed above, a steering house of this type often exhibits non-negligible backlash at several places in the torque transfer. As further disclosed above, there is a need for accurate monitoring and handling of backlash in a steering house 120 of a steering system 100a in a vehicle.

The embodiments disclosed herein therefore relate to mechanisms for compensating for backlash in a steering house 120 of a steering system 100a in a vehicle. In order to obtain such mechanisms there is provided a controller, a method performed by the controller, a computer program product comprising code, for example in the form of a computer program, that when run on the controller, causes the controller to perform the method.

Figure 2:
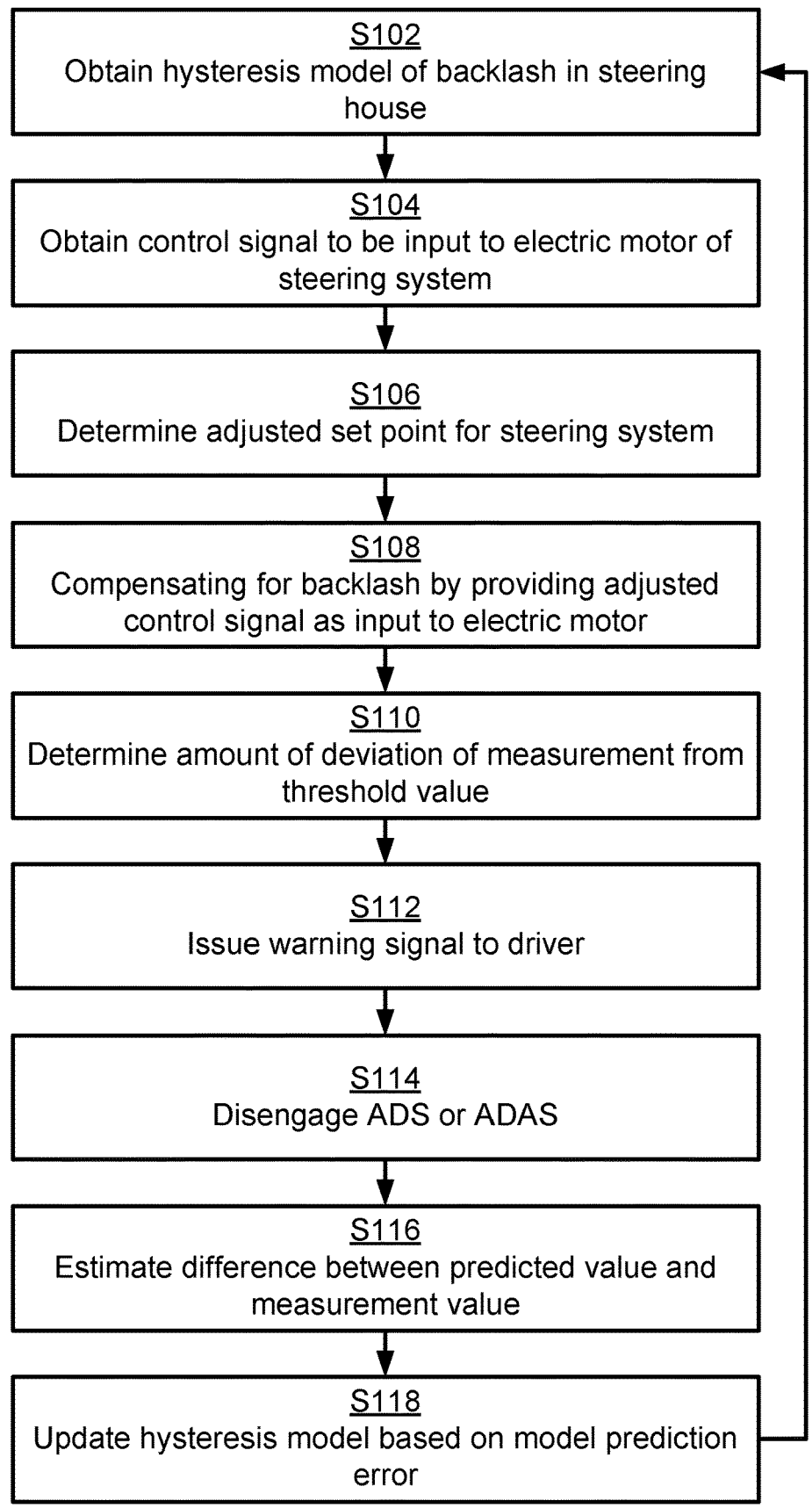
FIG. 2 is a flowchart of methods according to embodiments.

FIG. 2 is a flowchart illustrating embodiments of methods for compensating for backlash in a steering house 120 of a steering system 100a in a vehicle. The methods are performed by the controller 200. The methods are advantageously provided as computer programs.

Nonlinear hydraulic amplification and different backlashes can be modeled as hysteresis. The method is based on using the inverse of a hysteresis model of the backlash to compensate for hysteresis effects (i.e., backlash) in the steering house 120. A control signal is obtained (e.g. from a steering function) and an adjusted control signal is provided to the electric motor 110 of the steering system 100a. In particular, the controller 200 is configured to perform steps S102, S104, S106, and S108:

S102: The controller 200 obtains a hysteresis model of the backlash in the steering house 120. The hysteresis model has an inverse.

S104: The controller 200 obtains a control signal to be input to an electric motor 110 of the steering system 100a. The control signal defines a desired set point for the steering system 100a.

S106: The controller 200 determines an adjusted set point for the steering system 100a based on the inverse of the hysteresis model, the desired set point, and a current operating point in the hysteresis model. The adjusted set point defines an adjusted control signal.

S108: The controller 200 compensates for the backlash in the steering house 120 by providing the adjusted control signal, instead of the control signal, as input to the electric motor 110.

Embodiments relating to further details of compensating for backlash in a steering house 120 of a steering system 100a in a vehicle as performed by the controller 200 will now be disclosed.

Figure 3:
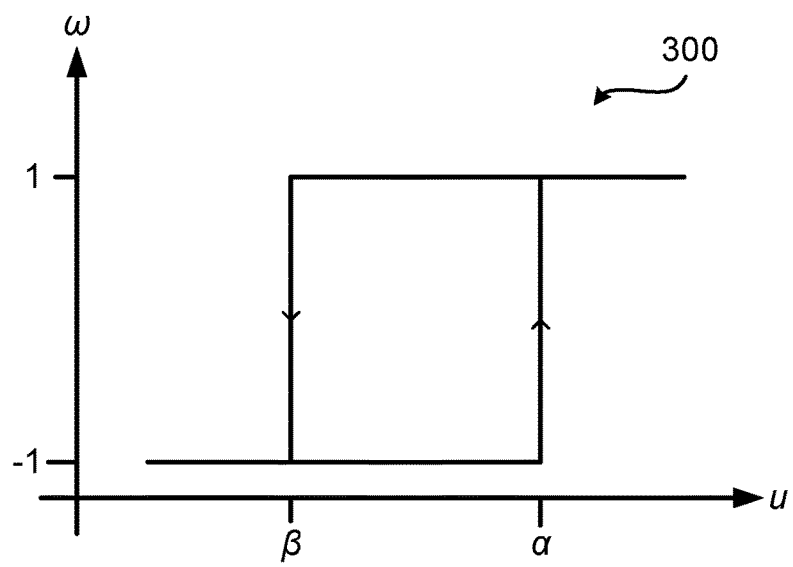
FIG. 3 schematically illustrates a Preisach hysteresis operator according to an embodiment.

There may be different types of hysteresis models. One model involves monitoring the rotor angle of the electric motor 110 and the output torque from the electric motor 110 when a sign change of the angular velocity of the rotor is observed. A rotation of the rotor while the motor outputs a low torque indicates that the gears are moving in the play, and hence that the steering house 120 exhibits backlash. Another model involves the use of Preisach hysteresis operators. That is, in some embodiments the hysteresis model is based on Preisach hysteresis operators. In this respect, the hysteresis can be modelled using so-called Preisach hysteresis operators where the hysteresis is modelled as a weighted integral over relay operators. For some scalars a and 13, where $\alpha \geq \beta$, consider the simple relay element $\hat{\gamma}_{\alpha\beta}$ illustrated at 300 in FIG. 3. Provided some initial condition $\xi=\{-, 1\}$ the output $\omega(t)=\hat{\gamma}_{\alpha\beta}[u, \xi]$ is defined as:

$$\omega(t) = \begin{cases} -1, & u(t) < \beta \\ 1, & u(t) > \alpha \\ \omega(t^-), & \text{otherwise} \end{cases}$$

The Preisach operator can then be expressed as:

$$y(t) = \iint\limits_{\alpha \geq \beta} \mu(\alpha, \beta)\hat{\gamma}_{\alpha\beta} d\alpha d\beta$$

where $\mu: R^2 \to R$ is the Preisach density function. The hysteresis model is then defined by the parameter $\mu$.

In some embodiments, the current operating point is represented by measurements taken at two places in the steering system 100a. According to the illustrative example of FIG. 1, there are two measurements: one measurement taken at point A before the steering house 120 and another measurement taken at point B after the steering house 120. That is, in some embodiments, a first of the measurements is taken upstream the steering house 120, and wherein a second of the measurements is taken downstream the steering house 120.

According to the illustrative example of FIG. 1, the measurements are of the angle of the input shaft and the output shaft of the steering box. That is, in some embodiments, the first of the measurements pertains to an angle of an input shaft of the steering house 120, and wherein the second of the measurements pertains to an angle of an output shaft of the steering house 120.

In some aspects, the controller 200 uses the inverse of the model to determine what the value on the input shaft to the steering house 120 (which is at point A) should be to give the value that the control signal as obtained in step S104, has commanded on the output shaft from the steering house 120 (which is at point B). That is, in some embodiments, the adjusted set point for the steering system 100a sets a desired value for the angle of the input shaft of the steering house 120.

Figure 4:
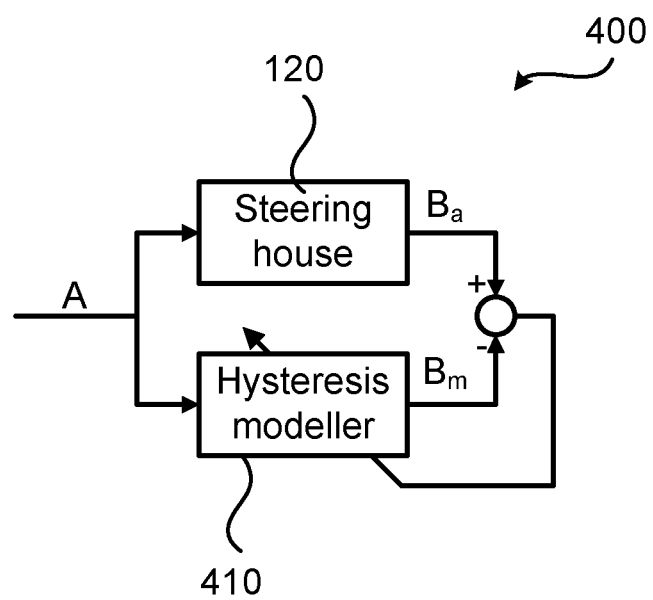
FIG. 4 is a block diagram of a steering house and a hysteresis modeller according to an embodiment.

Assume that the angle of the input shaft (which is at point A) and the output shaft (which is at point B) of the steering house 120, as illustrated in FIG. 1. How the Preisach density function can be estimated will now be disclosed with reference to the block diagram 400 of FIG. 4. Fig. schematically illustrates how measurements at the input and output of the steering house 120 are obtained by a hysteresis modeller 410. The hysteresis modeller 410 implements the hysteresis model. The angle of the input shaft (as represented by the measurement at point A) is thus used as input to the hysteresis modeller 410. The value (denoted $B_m$ in FIG. 4) as predicted by the hysteresis modeller 410 is then compared to the actual value (denoted $B_a$ in FIG. 4) of the angle of the output shaft (as represented by the measurement at point B) of the steering house 120. The difference between the predicted value $B_m$ and the actual value $B_a$ can then be used to drive the update of the hysteresis model so as to decrease the prediction error. That is in some embodiments, the controller 200 is configured to perform (optional) steps S116 and S118:

S116: The controller 200 estimates a difference between a value of the angle of the output shaft of the steering house 120 as predicted by the hysteresis model and the second of the measurements. The difference represents a model prediction error.

S118: The controller 200 updates the hysteresis model based on the model prediction error.

Steps S116 and S118 might be executed continuously whilst the method of FIG. 2 is running.

Figure 5:
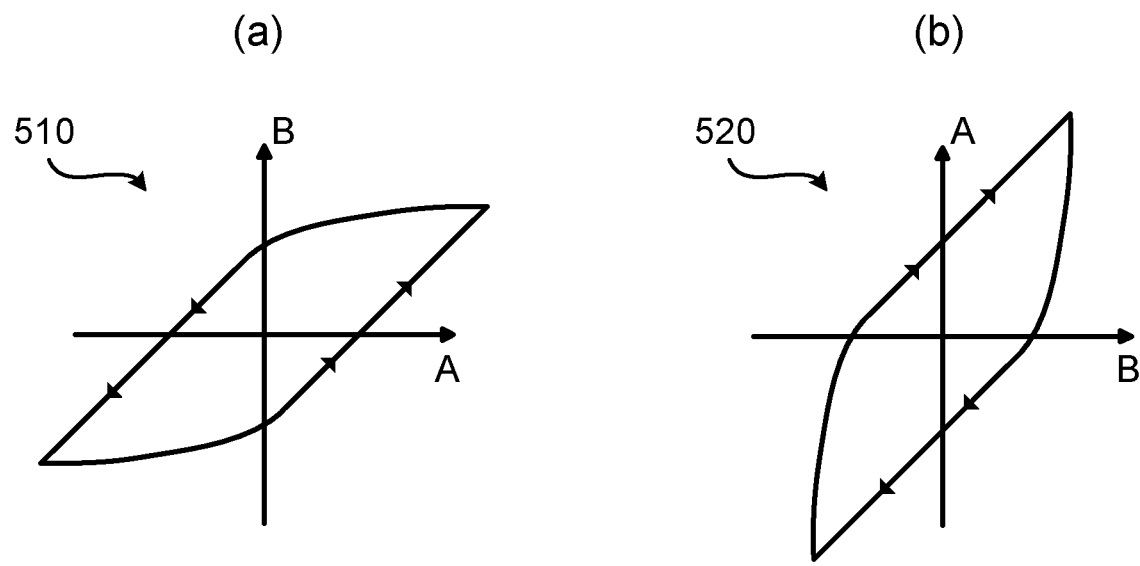
FIG. 5 shows a hysteresis curve and its inverse according to an embodiment.

In some embodiments, the hysteresis model defines a hysteresis curve, and the measurements uniquely define a point on the hysteresis curve. FIG. 5(a) illustrates at 510 an example of such a hysteresis curve and FIG. 5(b) illustrates at 520 the inverse of the hysteresis model in FIG. 5(a).

In some embodiments, the vehicle comprises and ADS or an ADAS, and wherein the steering system 100a is part of the ADS or ADAS. Oscillatory behaviour of the ADS or ADAS can then be prevented even if the steering house 120 exhibits a large backlash.

Figure 6:
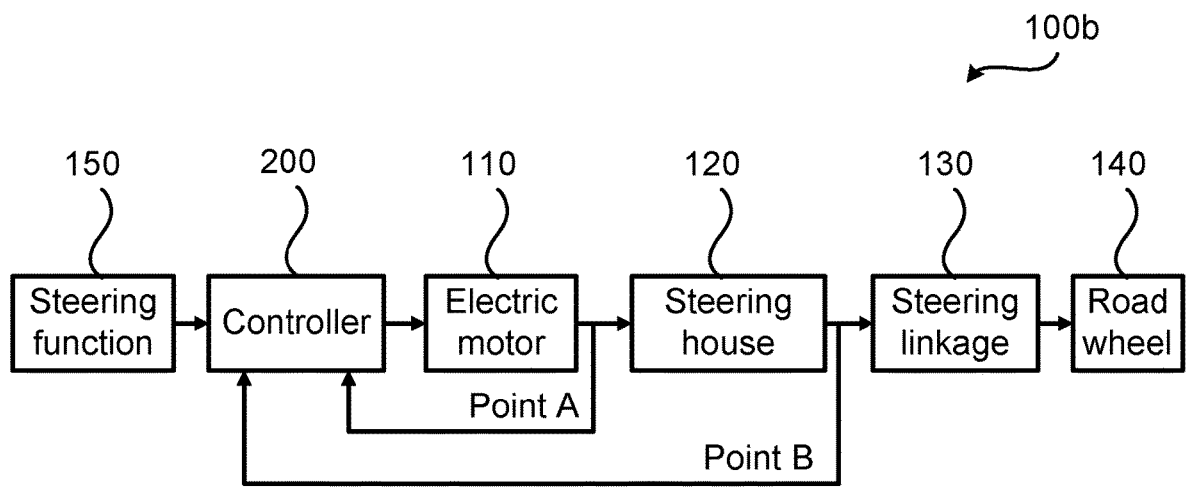
FIG. 6 is block diagram of a steering system according to an embodiment.

FIG. 6 is a block diagram of a steering system 100b according to an embodiment. The steering system 100b comprises the same components as the steering system 100a and additionally comprises the controller 200 and a steering function 150. The steering function 150 could be part of the ADS or ADAS. FIG. 6 schematically illustrates how the steering function 150 supplies a commanded value to the controller 200, where the commanded value sets a desired value for the angle of output shaft from the steering house 120. The control signal is then in step S104 obtained from the steering function 150. That is, in some embodiments, the control signal to be input to the electric motor 110 is provided as a command value from a steering function 150 of the ADS or ADAS, and the command value sets a desired value for the angle of the output shaft of the steering house 120.

In accordance with what has been disclosed above, when the steering function 150 supplies the commanded value, it in essence sets a desired value for point B in FIG. 1 (closely related to the road-wheel angle). This value is received by the controller 200. However, because of backlash, if this value is used as input to the steering house 120, the output from the steering house 120 will be incorrect. The controller 200 therefore effectuates the command by setting an internal reference value for the input shaft to the steering house 120. To compensate for backlash, the controller 200 uses the measurements from points A and B in FIG. 1 or FIG. 6 to determine the current operating point in the hysteresis model 410, and uses the inverse of the hysteresis model 410 to determine what the value on the input shaft to the steering house 120 (which is at point A) should be to give the value that the steering function 150 has commanded on point B.

It is noted that the steering function 150 might not be part of the ADS or ADAS functionality. As an example, instead of receiving input from the ADS or ADAS, the steering function 150 might be configured to receive input from the driver. For example, the steering function 150 might be configured to receive input from the steering column as connected to the steering wheel.

In some aspects, the model of the hysteresis is used to monitor that the backlash is not larger than what the control system has been designed to handle. That is in some embodiments, the controller 200 is configured to perform (optional) step S110:

S110: The controller 200 determines an amount of deviation of the second of the measurements from a first threshold value. The amount of backlash can then be defined by this amount of deviation.

Figure 7:
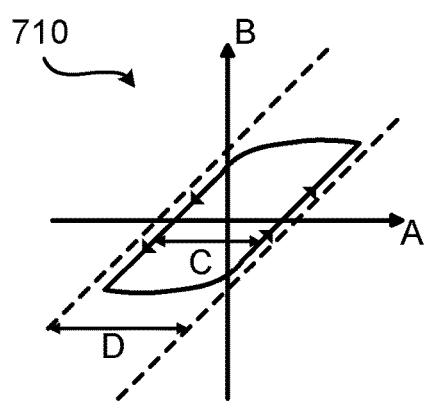
FIG. 7 shows a hysteresis curve according to an embodiment.

FIG. 7 schematically illustrates at 700 a hysteresis model that is representative of a maximum amount of backlash, in FIG. 7 defined by the width C, which can be compared to the first threshold value, in FIG. 7 defined by the width D. For instance, if it is known that the ADS or ADAS induces unacceptable oscillations for some lash or hysteresis width D or larger, and the estimate of the actual lash or hysteresis width defined by the width C, a system fault can be triggered when C>D. In this way, the width D serves as a specification of allowable values for the width C.

There could be different actions taken by the controller 200 when the amount of backlash, as defined by the amount of deviation, is too large.

In some aspects, the driver of the vehicle is warned. That is in some embodiments, the controller 200 is configured to perform (optional) step S112:

S112: The controller 200 issues a warning signal to a driver of the vehicle when the amount of deviation exceeds a second threshold value.

In some aspects, the ADS or ADAS is shut down. That is in some embodiments, the controller 200 is configured to perform (optional) step S112:

S114: The controller 200 disengages the ADS or ADAS when the amount of deviation exceeds a third threshold value.

In one example, the third threshold value is larger than the second threshold value. This example gives the driver the opportunity to by herself/himself shut down the ADS or ADAS. In another example, the third threshold value equals the second threshold value. This gives example gives the driver a warning that the ADS or ADAS is to be shut down (in case step S112 is performed before step S114).

Figure 8:
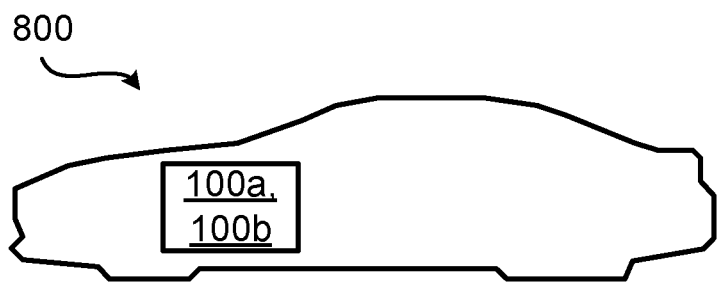
FIG. 8 schematically illustrates a vehicle according to an embodiment.

FIG. 8 schematically illustrates a vehicle 800. The vehicle 800 comprises a steering system 100a, 100b having a controller 200 as disclosed herein. There could be different examples of vehicle 800s. The vehicle 800 might be any of: a truck, a bus, a piece of construction equipment, or a personal vehicle 800. In this respect, the herein disclosed embodiments can thus be applied in heavy-duty vehicle 800s, such as trucks, buses and construction equipment as well as person vehicle 800s. The herein disclosed embodiments are applicable on working machines within the fields of industrial construction machines or construction equipment, such as wheel loaders, articulated haulers, excavators and backhoe loaders. However, the herein disclosed embodiments are not restricted to any particular type of vehicle 800.

Figure 9:
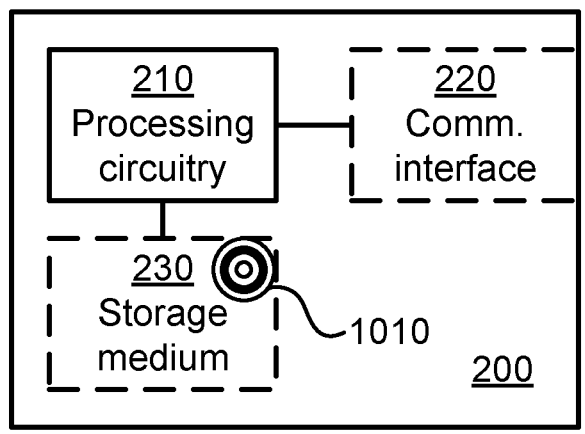
FIG. 9 is a schematic diagram showing functional units of a controller according to an embodiment.

FIG. 9 schematically illustrates, in terms of a number of functional units, the components of a controller 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1010 (as in FIG. 10), e.g. in the form of a storage medium 230. The processing circuitry 210 may further be provided as at least one application specific integrated circuit (ASIC), or field programmable gate array (FPGA).

Particularly, the processing circuitry 210 is configured to cause the controller 200 to perform a set of operations, or steps, as disclosed above. For example, the storage medium 230 may store the set of operations, and the processing circuitry 210 may be configured to retrieve the set of operations from the storage medium 230 to cause the controller 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The controller 200 may further comprise a communications interface 220 at least configured for communications with other entities of the steering system, the ADS or ADAS, and/or the vehicle. As such the communications interface 220 may comprise one or more transmitters and receivers, comprising analogue and digital components. The processing circuitry 210 controls the general operation of the controller 200 e.g. by sending data and control signals to the communications interface 220 and the storage medium 230, by receiving data and reports from the communications interface 220, and by retrieving data and instructions from the storage medium 230. Other components, as well as the related functionality, of the controller 200 are omitted in order not to obscure the concepts presented herein.

The controller 200 may be provided as a standalone device or as a part of at least one further device. Alternatively, functionality of the controller 200 may be distributed between at least two devices, or nodes. Thus, a first portion of the instructions performed by the controller 200 may be executed in a first device, and a second portion of the of the instructions performed by the controller 200 may be executed in a second device; the herein disclosed embodiments are not limited to any particular number of devices on which the instructions performed by the controller 200 may be executed. Hence, the methods according to the herein disclosed embodiments are suitable to be performed by a controller 200 residing in a cloud computational environment. Therefore, although a single processing circuitry 210 is illustrated in FIG. 9 the processing circuitry 210 may be distributed among a plurality of devices, or nodes.

Figure 10:
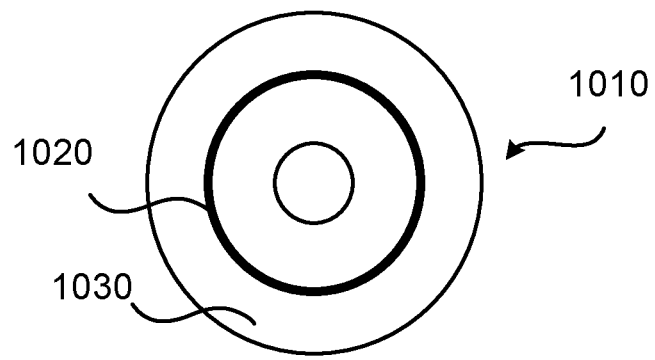
FIG. 10 shows one example of a computer program product comprising computer readable storage medium according to an embodiment.

FIG. 10 shows one example of a computer program product 1010 comprising computer readable storage medium 1030. On this computer readable storage medium 1030, a computer program 1020 can be stored, which computer program 1020 can cause the processing circuitry 210 and thereto operatively coupled entities and devices, such as the communications interface 220 and the storage medium 230, to execute methods according to embodiments described herein. The computer program 1020 and/or computer program product 1010 may thus provide means for performing any steps as herein disclosed.

In the example of FIG. 10, the computer program product 1010 is illustrated as an optical disc, such as a CD (compact disc) or a DVD (digital versatile disc) or a Blu-Ray disc. The computer program product 1010 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1020 is here schematically shown as a track on the depicted optical disk, the computer program 1020 can be stored in any way which is suitable for the computer program product 1010.

It is to be understood that the present invention is not limited to the embodiments described above and illustrated in the drawings; rather, the skilled person will recognize that many changes and modifications may be made within the scope of the appended claims.

The invention claimed is:

1. A method for compensating for backlash in a steering house of a steering system in a vehicle, the method being performed by a controller of the steering system, the method comprising:
   obtaining a hysteresis model of the backlash in the steering house, the hysteresis model having an inverse;
   obtaining a control signal to be input to an electric motor of the steering system, the control signal defining a desired set point for the steering system;
   determining an adjusted set point for the steering system based on the inverse of the hysteresis model, the desired set point, and a current operating point in the hysteresis model, wherein the adjusted set point defines an adjusted control signal; and
   compensating for the backlash in the steering house by providing the adjusted control signal, instead of the control signal, as input to the electric motor.

2. The method according to claim 1, wherein the hysteresis model is based on Preisach hysteresis operators.

3. The method according to claim 1, wherein the current operating point is represented by measurements taken at two places in the steering system.

4. The method according to claim 3, wherein a first of the measurements is taken upstream the steering house, and wherein a second of the measurements is taken downstream the steering house.

5. The method according to claim 4, wherein the first of the measurements pertains to an angle of an input shaft of the steering house, and wherein the second of the measurements pertains to an angle of an output shaft of the steering house.

6. The method according to claim 5, wherein the adjusted set point for the steering system sets a desired value for the angle of the input shaft of the steering house.

7. The method according to claim 5- or 6, wherein the method further comprises:
   estimating a difference between a value of the angle of the output shaft of the steering house as predicted by the hysteresis model and the second of the measurements, wherein the difference represents a model prediction error; and
   updating the hysteresis model based on the model prediction error.

8. The method according to claim 3, wherein the hysteresis model defines a hysteresis curve, and wherein the measurements uniquely define a point on the hysteresis curve.

9. The method according to claim 1, wherein the vehicle comprises and ADS or an ADAS, and wherein the steering system is part of the ADS or ADAS.

10. The method according to claim 5, wherein the control signal to be input to the electric motor is provided as a command value from a steering function of the ADS or ADAS, and wherein the command value sets a desired value for the angle of the output shaft of the steering house.

11. The method according to claim 5, wherein the method further comprises:
   determining an amount of deviation of the second of the measurements from a first threshold value.

12. The method according to claim 11, wherein the method further comprises:
   issuing a warning signal to a driver of the vehicle when the amount of deviation exceeds a second threshold value.

13. The method according to claim 9, wherein the method further comprises:
   disengaging the ADS or ADAS when the amount of deviation exceeds a third threshold value.

14. A controller for compensating for backlash in a steering house of a steering system in a vehicle, the controller comprising processing circuitry, the processing circuitry being configured to cause the controller to:
   obtain a hysteresis model of the backlash in the steering house, the hysteresis model having an inverse;
   obtain a control signal to be input to an electric motor of the steering system, the control signal defining a desired set point for the steering system;
   determine an adjusted set point for the steering system based on the inverse of the hysteresis model, the desired set point, and a current operating point in the hysteresis model, wherein the adjusted set point defines an adjusted control signal; and
   compensate for the backlash in the steering house by providing the adjusted control signal, instead of the control signal, as input to the electric motor.

15. The controller according to claim 14, wherein the hysteresis model is based on Preisach hysteresis operators.

16. The controller according to claim 14, wherein the current operating point is represented by measurements taken at two places in the steering system.

17. The controller according to claim 16, wherein a first of the measurements is taken upstream the steering house, and wherein a second of the measurements is taken downstream the steering house.

18. The controller according to claim 17, wherein the first of the measurements pertains to an angle of an input shaft of the steering house, and wherein the second of the measurements pertains to an angle of an output shaft of the steering house.

19. The controller according to claim 18, wherein the adjusted set point for the steering system sets a desired value for the angle of the input shaft of the steering house.

20. The controller according to claim 18, wherein the processing circuitry further is configured to cause the controller to:
   estimate a difference between a value of the angle of the output shaft of the steering house as predicted by the hysteresis model and the second of the measurements, wherein the difference represents a model prediction error; and
   update the hysteresis model based on the model prediction error.

21. The controller according to claim 16, wherein the hysteresis model defines a hysteresis curve, and wherein the measurements uniquely define a point on the hysteresis curve.

22. The controller according to claim 14, wherein the vehicle comprises and ADS or an ADAS, and wherein the steering system is part of the ADS or ADAS.

23. The controller according to claim 18, wherein the control signal to be input to the electric motor is provided as a command value from a steering function of the ADS or ADAS, and wherein the command value sets a desired value for the angle of the output shaft of the steering house.

24. The controller according to claim 18, wherein the processing circuitry further is configured to cause the controller to:
   determine an amount of deviation of the second of the measurements from a first threshold value.

25. The controller according to claim 24, wherein the processing circuitry further is configured to cause the controller to:

issue a warning signal to a driver of the vehicle when the amount of deviation exceeds a second threshold value.

26. The controller according to claim 22, wherein the processing circuitry further is configured to cause the controller to:
disengage the ADS or ADAS when the amount of deviation exceeds a third threshold value.

27. A vehicle, the vehicle comprising a steering system, the steering system comprising a controller according to claim 14.

28. A computer program for compensating for backlash in a steering house of a steering system in a vehicle, the computer program comprising computer code which, when run on processing circuitry of a controller of the steering system, causes the controller to:
obtain a hysteresis model of the backlash in the steering house, the hysteresis model having an inverse;
obtain a control signal to be input to an electric motor of the steering system, the control signal defining a desired set point for the steering system;
determine an adjusted set point for the steering system based on the inverse of the hysteresis model, the desired set point, and a current operating point in the hysteresis model, wherein the adjusted set point defines an adjusted control signal; and
compensate for the backlash in the steering house by providing the adjusted control signal, instead of the control signal, as input to the electric motor.

29. A non-transitory computer program product comprising a computer program according to claim 28, and a computer readable storage medium on which the computer program is stored.

* * * * *